Oct. 17, 1933.　　　F. A. BLASHFIELD　　　1,930,551
ELECTRICALLY HEATED APPARATUS
Filed Oct. 5, 1929　　　4 Sheets-Sheet 1
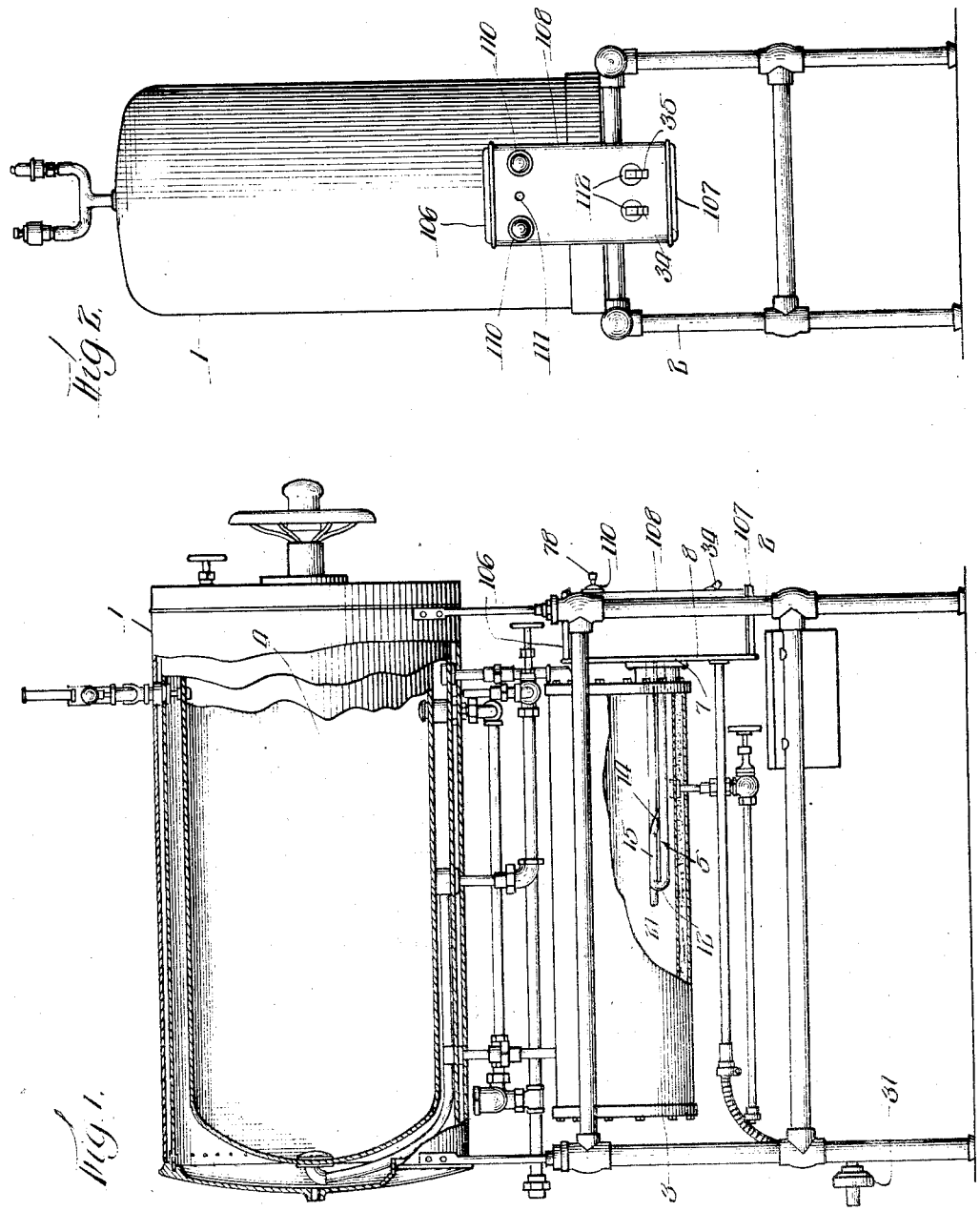
Inventor
Floyd A. Blashfield,
By Cheever, Cox & Moore
Attys Oct. 17, 1933.  F. A. BLASHFIELD  1,930,551
ELECTRICALLY HEATED APPARATUS
Filed Oct. 5, 1929   4 Sheets-Sheet 2
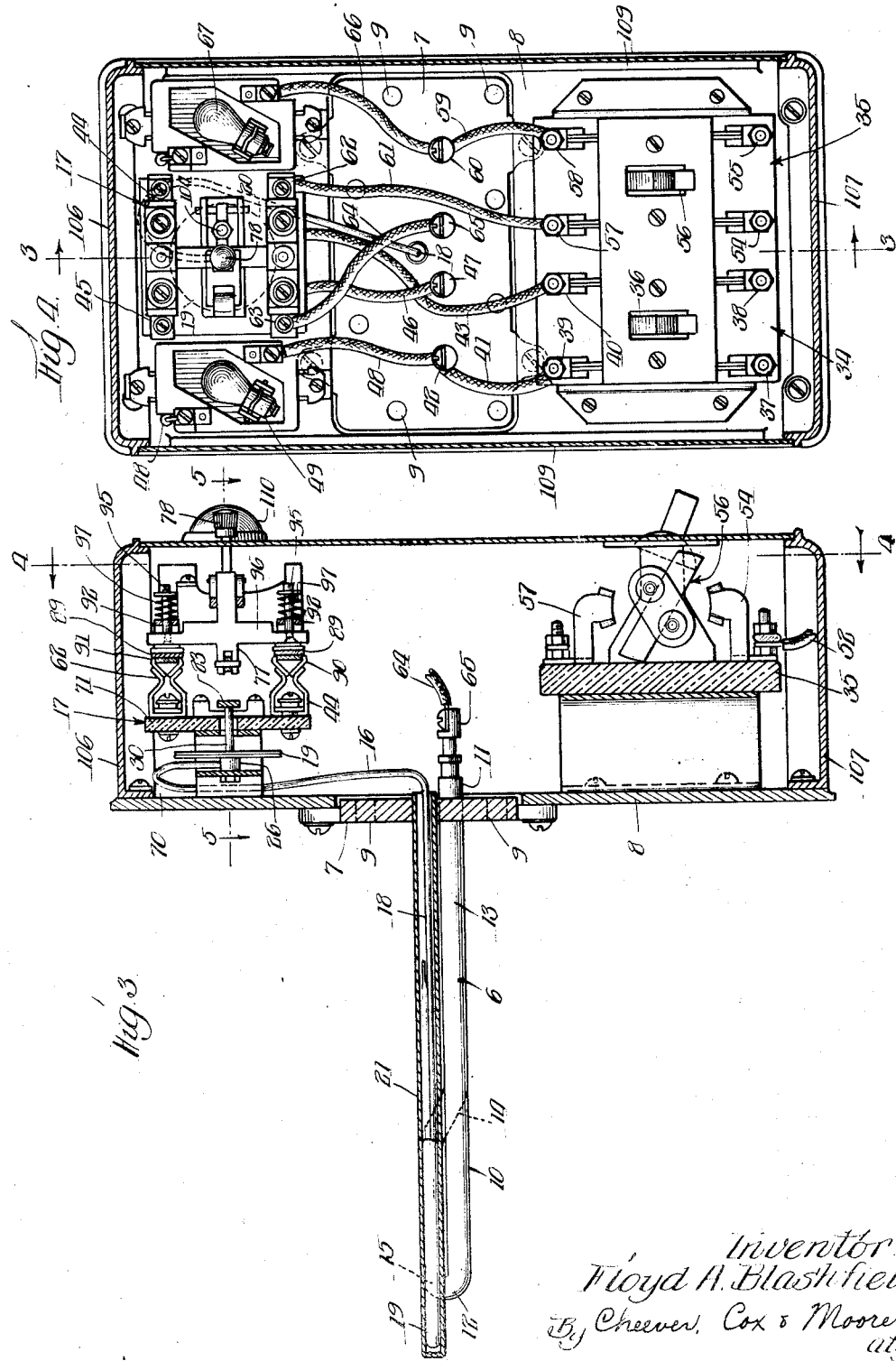
Inventor
Floyd A. Blashfield,
By Cheever, Cox & Moore
attys.

Oct. 17, 1933.     F. A. BLASHFIELD     1,930,551
ELECTRICALLY HEATED APPARATUS
Filed Oct. 5, 1929     4 Sheets-Sheet 3
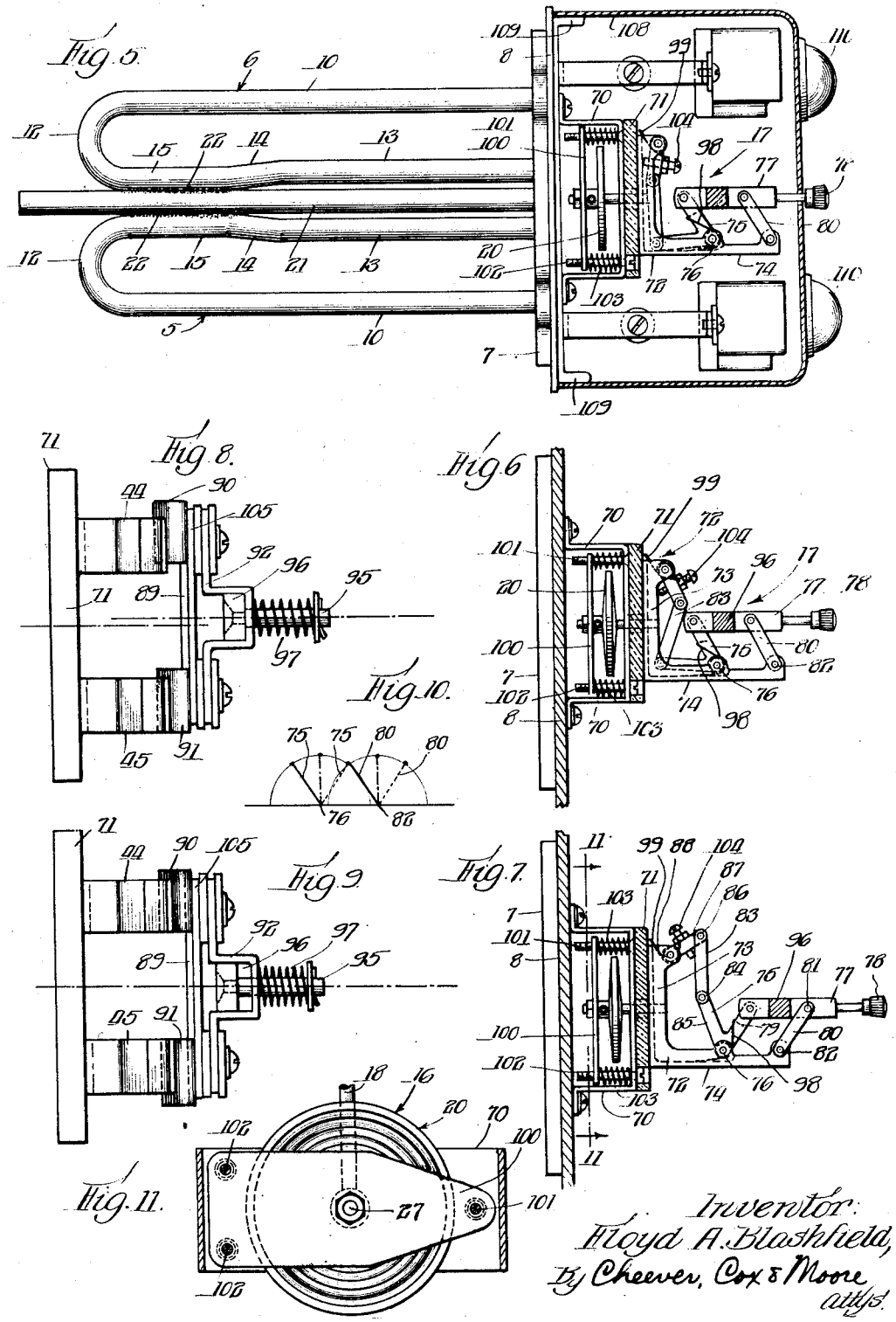

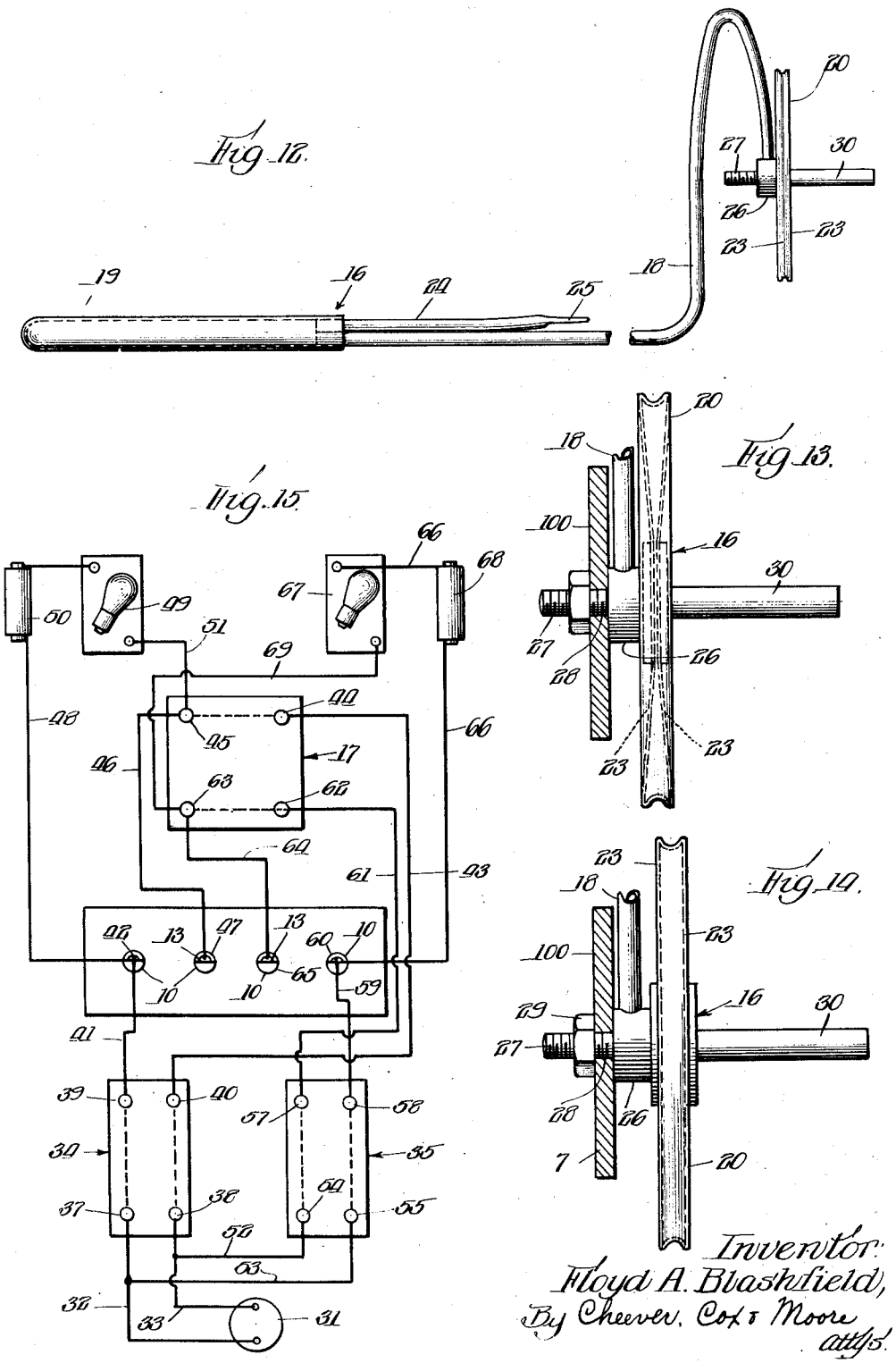

UNITED STATES PATENT OFFICE 1,930,551

ELECTRICALLY HEATED APPARATUS

Floyd A. Blashfield, Madison, Wis., assignor to Scanlan-Morris Company, Madison, Wis., a corporation of Wisconsin Application October 5, 1929. Serial No. 397,705

2 Claims. (Cl. 219—19)

This invention relates in general to electrically heated apparatus and particularly to electrically heated apparatus and appliances such as sterilizers, boilers, and other similar devices.

The present type of electrically heated apparatus and appliances which use immersion type heating units are constructed with the immersion unit attached to a separate head or panel with the wiring and switch controlling mechanism located in a different position and mounted on a separate panel. This conventional arrangement requires the removal of the heater head for cleaning and servicing, and also requires that the switch equipment and the conductors be disconnected. Removing and making new connections to the panel is confusing and there is always the possibility of a wrong connection being made. Also, there is the danger of accidentally grounding some of the wires, and the resultant shock to those operating and servicing the apparatus, as sterilizers and like apparatus are usually operated by others than skilled electricians.

The present invention provides a unitary device for sterilizers and like appliances and its primary object is to provide a removable head whereby the heating elements and electrical connections thereto may be completely assembled on the head.

Another object is to provide a combination heater head and control unit which is removably mounted on the front of the apparatus to which it is applied.

Another object is to provide a removable head having horizontal heater heads mounted thereon and arranged on the front of an apparatus with which it is used.

Another object is to provide a removable heater head and control unit for sterilizers or similar apparatus, whereby the heating elements, the switch equipment, and the electrical connections to the switch equipment and the heating elements are all operatively connected to a single member which is detachably and removably mounted on the apparatus.

A further object is to provide a removable heater head and control unit, whereby the heating elements, thermostats, pilot lights, and all electrical connections and switch equipment are mounted on a single panel and removably detached to the apparatus to be heated, only the socket to the source of electric supply and a few bolts being removed for disconnecting the head from the apparatus.

A still further object is to provide a new and improved switch for breaking the circuit between the main operating switches and the heating elements and the pilot lights.

Another object is to provide a thermo-sensitive element which is arranged in a particular position relative to the heating coils for operating an electric switch to cut off the current when the temperature of the heating elements reaches a pre-determined maximum.

Another object is to provide means for adjusting the thermostat diaphragm and the switch to move either the switch or diaphragm toward or away from each other and thereby effect either delayed or advanced operation of the switch.

Still another object is to provide an electrical circuit including a pair of hand controlled primary switches and a manually operated auxiliary switch, whereby a pair of heating elements and their co-operating pilot lights may be selectively or collectively operated.

A still further object is to provide a heating element having a portion thereof raised, whereby the raised portion will cause operation of the thermo-sensitive means when the normal water line of the sterilizers extends below the raised portions.

Further other objects and advantages will appear throughout the progress of the following specification:

The invention comprises in general a panel having a plate detachably connected thereto. Tubes are rigidly connected to the plate and carry the usual heating coils. A plurality of switches and their electrical connections are mounted on the panel and are electrically connected to the heating elements. A thermo-sensitive element is arranged in a tube which is rigid with the plate and arranged between the legs of the heating elements. The diaphragm of the thermo-sensitive element is mounted on the panel and is arranged to operate one of the switches for breaking the circuit.

Portions of the heating element are raised above their normal horizontal position to effect operation of the thermostat when the normal water line of the sterilizers extends below the top of the turned up portions of the heating elements. The main operating switches cause operation of the heating elements, either singly or collectively, while the auxiliary switch completely breaks the circuit to both of the heating elements. Pilot lights are operatively connected to the heating elements so it can be readily ascertained whether or not the heating elements are operating. Separate means are provided for the diaphragm and for the auxiliary switch to adjust each of these members toward and away from each other to effect either delayed or advanced operation of the auxiliary switch.

The accompanying drawings illustrate a selected embodiment of the drawings and the views are as follows:

Fig. 1 is a side elevation, partly in section, of a sterilizer having the invention applied thereto;

Fig. 2 is a front elevation of another type of sterilizer to which the invention is applied;

Fig. 3 is a detailed sectional view of the improved apparatus in the line 3—3 of Fig. 4;

Fig. 4 is a front view thereof on the line 4—4 of Fig. 3;

Fig. 5 is a detailed sectional view on the line 5—5 of Fig. 3, and shows the electric switch in closed or contacting position;

Fig. 6 is a similar view with certain parts omitted and shows the switch in intermediate position;

Fig. 7 is a view similar to Fig. 6, showing the switch in open and non-contacting position;

Figs. 8 and 9 are detailed top plan views of the switch showing the wiping action of contacts;

Fig. 10 is a diagrammatic or schematic view showing the manner in which the thermostatic controlled switch operates;

Fig. 11 is a detailed view on the line 11—11 of Fig. 7 and shows a portion of the thermostatic control;

Fig. 12 is a side view of the thermostat;

Fig. 13 is a detailed sectional view of the thermostat;

Fig. 14 is a detailed side view thereof; and

Fig. 15 is a wiring diagram showing the various electrical connections.

Referring to the drawings, 1 designates a steam sterilizer or other apparatus requiring heat, of either the horizontal type shown in Fig. 1, or the vertical type shown in Fig. 2. The sterilizer is mounted on a stand 2 and is operatively connected to a boiler or other vessel or receptacle in which steam is generated for the chamber 4 of the sterilizer.

A pair of heating elements 5 and 6 are rigidly connected to a plate 7 which is detachably fastened to a panel 8. Bolts pass through holes 9 in the plate 7 for detachably connecting the plate 7 to a part of the tank 3. The heating elements 5 and 6 comprise a plurality of tubes 10, Fig. 5, in which the usual heating coils are arranged. Holes are provided in plate 7 through which the ends 11 of the tubes may project. Terminals are fastened to the ends 11 of the tubes to which an electrical connection is made for supplying current to the heating coils. The tubes 10 may be made of a single piece of tubing and bent round at 12, as clearly shown in Fig. 5. The inner legs 13 of the tubes 10 are bent upwardly at 14 from their normal plane to provide a raised horizontal portion 15, Figs. 3 and 5. The purpose of raising a portion of the tubes is to have only a small portion of the tubes extending above the water in tank 3 when the normal water line lowers. This higher exposed portion is heated by the coils in the tube at a temperature higher than the tubes below the water line and causes operation of a thermo-sensitive element 16 at a time when there is a sufficient amount of water in the tank to cover the greatest portion of the heating element. The thermo-sensitive element operates a switch 17, which breaks the electrical circuit when the temperature of the heating units reaches a certain pre-determined maximum temperature.

The thermo-sensitive element 16, Fig. 12, comprises a tube or pipe 18 which has a bulb 19 at one end and a diaphragm 20 at the other end. A material which expands under heat may be contained in the element, but it has been found that xylol works very satisfactorily, and this is the material which is preferably used in connection with the present apparatus.

A tube 21 is arranged between the legs 13 of the tubes 10, Figs. 3 and 5, and extends a distance beyond the ends of these tubes. This tube extends through a hole provided in the plate 7 and permits the bulb 19 to be inserted in the tube from the front of the panel 8. This tube is arranged at the same level as the raised ends 15 of the tubes 10, and the bulb 19 is arranged in this tube 21, so that it will overlap the raised portion 15 of tubes 10 a slight distance at each end. The tube 21 is rigidly connected to the raised portions 15 of the tubes 10 at 22, Fig. 5, by brazing or by hard soldering. Silver solder has been found to produce very good results as it conducts the heat rapidly from the legs 13 to the tube 21, which transmits the heat to the bulb 19.

Xylol begins to produce a vapor pressure at about 285° F., and expands the diaphragm 20 to operate the switch 17 whenever the temperature in the heating unit 3, exceeds that temperature. The diaphragm has circularly corrugated sides 23, which are dished inwardly as shown in Fig. 13. The xylol is put in the element through a pipe 24, Fig. 12, which has communication with the bulb 19. After sufficient xylol is provided in the element the free end of the tube 24 is pinched shut at 25, Fig. 11. During normal operation of the sterilizer, or other electrically heated apparatus, the diaphragm only swells to bring the sides 23 straight and parallel with each other, as shown in Fig. 14. After the heat in the boiler or tank 3 reaches a certain predetermined maximum the diaphragm will swell at a rapid rate and operate the switch 17 to disconnect the electric supply.

The diaphragm 20, Figs. 12 to 14, has a hollow hub 26 formed on its rear side, and this hub has communication with the body of the diaphragm 20 and the tube or pipe 18. A threaded stem 27 is rigidly connected to the hub 26 and extends through a hole 28 in the member to which it is attached. A nut 29 has threaded engagement with the stem 27 and rigidly but disconnectibly holds the diaphragm in proper operative position on its support. An operating finger 30 is arranged on the front of the diaphragm, and it is this finger which operates the switch 17 when the diaphragm expands when the temperature in the tank 3 reaches a pre-determined maximum.

An electric plug 31, Fig. 1, which has electrical connection with a source of electric supply is connected to conductors 32 and 33 which are operatively connected to a pair of electric switches 34 and 35, mounted on the panel 8, Figs. 4 to 15. Snap switch mechanism 36 is provided for making and breaking contact between the contacts 37 and 38 to which the lines 32 and 33 are electrically connected and to the contacts 39 and 40. A conductor 41 connects contact 39 and a terminal 42 of the heating element 5, while a conductor 43 makes electrical connection with contact 40 and a contact 44 of the switch 17. The switch 17 makes or breaks the circuit between the contact 44 and a second contact 45 of the switch 17. A conductor 46 electrically connects the contact 45 to a terminal 47 at the other side of the heating element 5. A conductor 48 is electrically connected to the line 41 at the terminal 42 and to one side of a lamp or pilot light 49, the current first passing through a resistance coil 50. A conductor 51 is electrically connected to the other side of the lamp 49 and to the contact 45 of the switch 17. When the current is on and the switches 34 and 17 are closed, the heating element 5 will be on and the pilot light 49 will be lighted. When the switch 34 is off, the circuit will be broken and the heating element will not be in operation, and the light 49 will not be lighted. Or, if the switch 34 is on and the thermostat operates the switch 17, contact will be broken between the contacts 44 and 45, the heating element will not operate to generate heat, and the pilot light will be out.

The switch 35 is operatively connected to the heating element 6 in exactly the same manner as the switch 34 is connected to the heating element 5. Conductors 52 and 53 are tapped from the main supply lines 32 and 33, and are electrically connected to the contacts 54 and 55. A snap switch mechanism 56 is provided for making or breaking contact between the contacts 54 and 55 to which the lines 52 and 53 are connected and to the contacts 57 and 58.

A conductor 59 connects the contact 58 and a terminal 60 of the heating element 6, while a conductor 61 makes electrical connection with the contact 57 and a contact 62 of the switch 17. This latter switch makes or breaks the circuit between the contact 62 and a second contact 63 of the switch 17, and a conductor 64 electrically connects the contact 63 to a terminal 65 of the heating element 6. A conductor 66 is electrically connected to the line 59 at the terminal 60 and to one side of a pilot light or lamp 67, the current first passing through a resistance coil 68. A conductor 69 is electrically connected to the other side of the lamp 67 and to the contact 63 of the switch 17. The circuit just described operates exactly in the same manner as the previous circuit, the heating element 6 and the lamp 67 being turned on and off according to the position of the switches 17 and 35.

The switches 34 and 35 may be of any desired type and are connected in parallel so that when the switch mechanism 36 is operated, the heating element 5 may be turned on and off, as desired, without in any way affecting the heating element 6. When the switch mechanism 56 is operated, the heating element 6 may be turned on and off, as desired. If both switch mechanisms 36 and 56 are operated, both heating elements may be brought into operation. In this manner one-half heat may be used, or full heat may be had when desired. Switch 17, however, completely breaks all circuits when it is operated by the thermo-sensitive element 16.

The switch 17 is mounted on a saddle 70 which is fastened to the panel 8 by means of screws or bolts. An insulated switch panel 71 is connected to the front of the saddle and is spaced from the back of the panel 8. The contacts 44, 45, 62 and 63 are connected to the insulated switch panel 71, which has an angularly shaped standard or support 72, rigidly connected thereto, Figs. 5 to 7. This support is U-shaped in cross section and has a base portion 73, which is fastened to the panel 71 and an upright portion 74, which is preferably made integral with the base 73. An angle lever 75 is pivoted on a pin 76 which is mounted between the sides of the upright portion 74 of the standard 72. A switch operating bar 77 having a knob or handle 78 is pivotally connected to an arm 79 of the lever 75. A link 80 is pivotally connected to the lever 77 at 81 and to the upright portion 74 at 82. A link 83 has one of its ends pivoted at 84 to the arm 85 of the lever 75 and its other end pivoted at 86 to a lever or arm 87 which is pivotally connected to a pin 88 mounted between the sides of the base portion 73 of the member 72.

A pair of bus bars 89, each carrying contacts 90 and 91 for engagement with the contacts 44 and 45 and contacts 62 and 63 respectively, are mounted on cross yokes 92. These yokes are provided with holes through which a pin 95, formed on a cross arm 96, which is integrally or otherwise rigidly fastened to the bar 77 fits. The ends of this cross arm are recessed and fit in the bridge of the yoke. A spring 97 surrounds each pin 95 and yieldingly holds the bus bars in position, relative to the contacts which are mounted on the switch base or panel 71. A spring 98 is mounted on the pin 76 and engages the angle lever 75 for normally urging the cross arm upwardly towards open position. When the switch is in closed position, Fig. 5, the link 83 drops below its horizontal axial center line, and a spring 99, which is mounted on the pin 88 and engages the lever 87, forces the lever 87 to drop below the center line of the link 83. This spring urges the link 83 in downwardly position and locks the switch in closed or contacted position, Fig. 5.

The diaphragm 20 of the thermostatic device 16 is mounted on a plate 100, Fig. 11, between the back panel 8 and the saddle 70 by means of adjustable threaded member 101 and a pair of threaded members 102. These threaded members have engagement with the saddle 70 and the plate 100, and springs 103 which surround the members 101 and 102, engage the yoke 70 and the plate 101 to normally urge the plate 100 and the diaphragm away from the top of the yoke 70. The finger or pin 30 on the diaphragm 20 extends through aligned holes in the panel 71 and the base 74, and has normal contacting engagement with the link 83 when the switch is in locked or closed position. When heat generated by the elements 5 and 6 exceed the predetermined maximum, the thermostat will operate by swelling the diaphragm 20 and cause the finger 30 to move inwardly through the aligned holes, and push against the link 83 to move it past its normal horizontal axial center line. When this link reaches this point, the spring 97 will pull the angle lever 75 with a quick snap action and break contact between the contacts on the switch panel and those on the bus bars 89.

The bus bars being pivoted to the cross arm, which is pivoted to the upright 74 necessarily causes the contacts to swing in an arc during operation of the switch, as shown diagrammatically in Fig. 10. As the switch is manually operated to close the circuit, the contacts 90 and 91 will first engage the contacts 44, 45, 63 and 64, as shown in Fig. 8. Continued pressure on the operating handle or knob 78 causes the contacts 90 and 91 to slide along or wipe against the contacts on the panel 71. This wiping action keeps the contacts clean at all times and insures proper and positive contact.

In operation with the switch 17 in closed position, the switches 34 and 35 are closed to heat the elements 5 and 6. If only one heating element is desired for operation, its controlling switch 34 or 35, as the case may be, is switched on, the other being left open. If both heating coils are to be put in operation both the switches 34 and 35 are closed. When the temperature of heating units exceeds its predetermined maximum, or if the water in the tank gets below the upturned ends 15 of the elements 5 and 6 to heat the element beyond normal temperature, the xylol in the thermo-sensitive element will cause the diaphragm 20 to swell and move the finger 30 to push the link 83 of the switch 17. As the link 83 is moved past its normal horizontal axial center line, the spring 97 will pull the bus bars upwardly and break the circuit. The heating elements will then be without current and generate no heat, and the pilot lights will be out. In order to again make electrical connection with the heating elements or the pilot lights, the switch 17 must be manually closed. The contacts 44, 45, 62 and 63 are relatively springly or yieldable, and the yieldable mounting of the yokes 89 on the cross arm 96 causes absolute engagement of the contacts.

In order to insulate the bus bars from the cross arm, a strip of insulating material 105, Figs. 8 and 9, is arranged between the yokes 92 and the bus bars 89. A set screw is provided in the link or lever 89 to adjust the movement of this lever and thereby bring the link 83 closer or further away from the finger 30. The adjustable threaded member 101 may also be adjusted to bring the finger 30 further away or closer to the link 83, the set screw 104 and the screw 101 providing two means for adjusting the action of the switch 17.

Top and bottom horizontal plates 106 and 107, respectively, Fig. 3, are fastened to the top and bottom of the panel 8, and a U-shaped cover member 108, Fig. 5, is fastened to flanges 109 formed on the sides of this panel. Colored glasses 110, Figs. 2 and 5, are set in the cover 108 in front of the pilot lights to ascertain if the pilot lights are lighted, to indicate if either or both of the heating elements are in operation. Holes 111 and 112 are provided in the cover 108, through which the operating parts of the switches 17, 34 and 35, respectively, extend, Fig. 2.

The invention provides an enclosed panel having all the electrical connections, the heating elements, and the switch equipment fastened thereto. In order to clean the tank 3 or to clean the heating elements 5 and 6, or to make repairs thereto, the entire device may be removed from its apparatus, by merely pulling the plug 31 from its co-operating socket member and by removing a few bolts which are readily accessible. The heating coils are arranged horizontally instead of in the usual vertical position to permit the elements to remain under water a longer period of time. The entire panel and its attached parts are mounted on the front of the apparatus to which it is applied, where it is always readily accessible. The switch 17 is positive in operation, providing wiping of the contacts, and by adjusting the diaphragm or the switch set screw, the switch can be forced to operate earlier or later, as conditions require. The thermo-sensitive element and its particular location, relative to the heating coils insures proper and accurate temperature control, and the particular construction of the thermo-sensitive element provides positive means for operating the switch. The switches 34, 35 and 17 permit either or both of the elements to be brought into operation; the switch 17 not only breaking the circuit to the elements 5 and 6, and the lights 49 and 67, but also cuts off all current coming in through the supply lines 32 and 33.

The present case shows the improved removable combination heater head and control unit applied to a single sterilizer, but it is to be understood that the unit is applicable to any type of apparatus requiring a heater element and the device may be used to control any number of apparatus.

Changes may be made in the form, construction and arrangement of the parts without departing from the spirit of the invention or sacrificing any of its advantages, and the right is hereby reserved to make all such changes, as fairly fall within the scope of the following claims:

The invention is hereby claimed as follows:

1. An electrical heating apparatus comprising a receptacle adapted to contain a liquid and having an opening therein, a removable plate mounted on the front of said receptacle for closing said opening, horizontally extending heating elements detachably mounted on the back of said member and extending into the interior of the receptacle, said heating elements having their outer ends bent and extending in a plane above the normal horizontal plane of the heating elements, a horizontal tube arranged between the heating elements and in the same plane as the raised portions of the heating elements, said tube being also mounted on the back of the said member, an electric switch mounted on the front of said member, a thermostat removably arranged in said tube for controlling the operation of said switch, electric conductors operatively connected to said switch and heating elements, and a removable cover mounted on the front of said member.

2. In an electrically heated apparatus, a heating element therefor and comprising a horizontal portion and an integral portion raised above the normal horizontal plane of said horizontal portion, and means for controlling the operation of the heating element, said means including horizontal thermo-sensitive means arranged adjacent the raised portion of said heating element and positioned in substantially the same horizontal plane as said raised portion.

FLOYD A. BLASHFIELD.